(12) United States Patent
Reed

(10) Patent No.: US 6,435,788 B2
(45) Date of Patent: Aug. 20, 2002

(54) THREAD REPAIR INSERT

(76) Inventor: Gary Jack Reed, 1015 S. Soderquist Rd., Turlock, CA (US) 95380

(*) Notice: Subject to any disclaimer, the term of this patent is extended or adjusted under 35 U.S.C. 154(b) by 0 days.

(21) Appl. No.: 09/813,089

(22) Filed: Mar. 19, 2001

Related U.S. Application Data (62) Division of application No. 08/727,840, filed on Oct. 2, 1996.

(51) Int. Cl.[7] .............................. F16B 37/12; B23P 6/00
(52) U.S. Cl. ...................... 411/178; 411/187; 411/411; 29/402.11; 29/402.17
(58) Field of Search ................................. 411/3, 5, 178, 411/186, 187, 189, 411, 438; 29/402.11, 402.17

(56) References Cited

U.S. PATENT DOCUMENTS

| | | |
|---|---|---|
| 83,371 A | 10/1868 | Foster |
| 154,864 A | 9/1874 | Harvey |
| 250,728 A | 12/1881 | Harvey |
| 310,462 A | 1/1885 | Patten |
| 568,277 A | 9/1896 | Rall |
| 638,326 A | 12/1899 | Farr |
| 678,814 A | 7/1901 | Riggs |
| 899,916 A | 9/1908 | Smith |
| 1,345,425 A | 7/1920 | Wells |
| 1,408,793 A | 3/1922 | Anderson, Jr. et al. |
| 1,434,870 A | 11/1922 | Brubaker, Jr. |
| 1,539,628 A | 5/1925 | Bayer |
| 1,543,007 A | 6/1925 | Hanson |
| 1,963,542 A | 6/1934 | Bergstrom |
| 2,011,484 A | 8/1935 | Harman ..................... 29/156.4 |
| 2,121,692 A | 6/1938 | Hays ........................... 29/148 |
| 2,291,162 A | 7/1942 | Kirby ........................... 29/148 |
| 2,300,310 A | 10/1942 | Poeton ........................ 10/141 |
| 2,361,701 A | 10/1944 | Michaels ..................... 29/148 |
| 2,506,233 A | 5/1950 | Murphy ....................... 189/36 |
| 2,649,650 A | 8/1953 | Javor ........................... 29/148 |
| 2,951,506 A | 9/1960 | Diperstein ................... 138/99 |
| 2,998,645 A | 9/1961 | Diperstein ................... 29/402 |
| 3,066,400 A | 12/1962 | Forsythe ..................... 29/402 |
| 3,117,486 A | 1/1964 | Matthews |
| 3,179,144 A * | 4/1965 | Brown ........................ 411/178 |
| 3,295,580 A | 1/1967 | Waltermire ................... 151/37 |
| 3,319,690 A * | 5/1967 | Rosan et al. ................. 411/178 |
| 3,660,233 A | 5/1972 | Dalke et al. .................. 176/87 |
| 4,074,950 A | 2/1978 | Holmes ....................... 408/220 |
| 4,165,904 A | 8/1979 | Reppert |
| 4,271,554 A | 6/1981 | Grenell ..................... 10/152 T |
| 4,295,765 A | 10/1981 | Burke |

(List continued on next page.)

FOREIGN PATENT DOCUMENTS

| | | |
|---|---|---|
| AU | 154074 | 11/1953 |
| GB | 350141 | 6/1931 |
| IT | 456481 | 12/1950 |
| SU | 492389 | 1/1976 |
| SU | 975270 | 11/1982 |

OTHER PUBLICATIONS

Time–Sert and Big–Sert advertisement, Screw Threads Inserts, 1999, entire advertisement.
Keen–Serts advertisement, Solid Inserts, 1996, entire advertisement.
Heli–Coil advertisement, Screw Thread Inserts, 1998, entire advertisement.

*Primary Examiner*—Neill Wilson
(74) *Attorney, Agent, or Firm*—Bernhard Kreten (57) ABSTRACT

An insert for thread repair having an interior thread and a specially formed exterior thread which both precludes upheaval between sides of the cracked material on opposite sides of the crack and draws the crack together, radially inward towards the center of the insert. The insert may include a driving head, either solid or having a central hollow and may include a frangible neck to dissociate the head from the insert.

8 Claims, 8 Drawing Sheets

U.S. PATENT DOCUMENTS

| | | |
|---|---|---|
| 4,599,781 A | 7/1986 | Diperstein ............... 29/402.11 |
| 4,662,806 A | 5/1987 | Reed .............................. 411/2 |
| 4,730,968 A * | 3/1988 | Diperstein et al. .......... 411/178 |
| 4,810,149 A | 3/1989 | Lee et al. |
| 4,824,279 A | 4/1989 | Casazza ...................... 403/294 |
| 4,845,828 A | 7/1989 | Reed ....................... 29/402.15 |
| 4,892,429 A | 1/1990 | Giannuzzi ................... 411/383 |
| 5,033,919 A | 7/1991 | Choe .......................... 408/217 |
| 5,379,505 A | 1/1995 | Reed ....................... 29/402.17 |
| 5,435,678 A | 7/1995 | Stencel |
| 5,499,892 A | 3/1996 | Reed |

* cited by examiner

THREAD REPAIR INSERT

This application is a division of U.S. Ser. No. 08/727,840, filed Oct. 2, 1996, pending.

FIELD OF THE INVENTION

The present invention relates generally to thread repair inserts and, in particular, to a thread repair insert and method for repairing threaded holes disposed in materials and for repairing threaded holes disposed in materials in which a crack has propagated therethrough such that the repaired threaded hole may receive a threaded fastener via the insert.

BACKGROUND OF THE INVENTION

Materials often exhibit a variety of different failure mechanisms. On occasion, materials are loaded beyond a tensile strength of the material and the material fractures abruptly and completely. In these circumstances the material is usually non-repairable and must be replaced. However, often materials do not fail in an abrupt complete manner, but rather fail due to fatigue or localized stresses which exceed design criteria, causing cracks to form in the material. Often when these cracks initially form, the material is still functional for its desired purpose. For instance, a reciprocating machine may receive cracks in its structural material and yet continue to operate, albeit at perhaps a lesser efficiency. Cracks thus serve as indicators that a material is being over stressed and yet also provides an opportunity for remedial measures to be taken without requiring entire replacement of the affected material.

Where the crack passes through a preexisting hole, however, such as through a stud hole, or worse, a spark plug hole, a severe problem exists.

Crack repair pins are known in the art which are threaded into holes drilled and tapped in the cracks to prevent cracks from continuing to propagate. U.S. Pat. No. 5,379,505 (issued to the present inventor) provides one example of these crack repair pins. These crack repair pins have been effective in resealing materials such as cast iron casings which require that they maintain a somewhat pressurized environment without allowing fluids to escape therefrom.

In addition, locks are known in the art which can draw cracks together somewhat and extend the life of the material which is cracked. One example of this can be found in the inventor's U.S. Pat. No. 4,662,806.

However, neither of these solutions nor the prior art which applicant is aware address a threaded hole which needs repair to receive a threaded fastener and specifically, the repair of a threaded hole in which a crack has propagated therethrough. Where the threaded hole is a spark plug hole, the problem is quite severe because of the internal pressures within the combustion chamber.

For example, a damaged threaded hole in which a threaded fastener is to be received in needs to be strengthened to a level which effectively allows the threaded fastener to be rigidly retained therein. In addition, the damaged threaded hole may need to be repaired to a level which allows parts to be coupled to one another to effectively provide a seal which will withstand a pressurized environment. Furthermore, the damaged threaded hole may be disposed in a material at a location which requires the walls of the hole to provide means to maintain a somewhat pressurized environment without allowing fluids to escape therefrom.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 83,341 | October 27, 1868 | Foster |
| 154,864 | September 8, 1874 | Harvey |
| 250,728 | December 13, 1881 | Harvey |
| 310,462 | January 6, 1885 | Patten |
| 568,277 | September 22, 1896 | Rall |
| 678,814 | July 16, 1901 | Riggs |
| 899,916 | September 29, 1908 | Smith |
| 1,345,425 | July 6, 1920 | Wells |
| 1,408,793 | March 7, 1922 | Anderson, et al. |
| 1,434,870 | November 7, 1922 | Brubaker, Jr. |
| 1,539,628 | May 26, 1925 | Bayer |
| 1,543,007 | June 23, 1925 | Hanson |
| 1,963,542 | June 19, 1934 | Bergstrom |
| 2,011,484 | August 13, 1935 | Harman |
| 2,121,692 | June 21, 1938 | Hays |
| 2,291,162 | July 28, 1942 | Kirby |
| 2,300,310 | October 27, 1942 | Poeton |
| 2,361,701 | October 31, 1944 | Michaels |
| 2,506,233 | May 2, 1950 | Murphy |
| 2,649,650 | August 25, 1953 | Javor |
| 2,951,506 | September 6, 1960 | Diperstein |
| 2,998,645 | September 5, 1961 | Diperstein |
| 3,066,400 | December 4, 1962 | Forsythe |
| 3,295,580 | January 3, 1967 | Waltermire |
| 3,660,233 | May 2, 1972 | Dalke, et al. |
| 4,074,950 | February 21, 1978 | Holmes |
| 4,271,554 | June 9, 1981 | Grenell |
| 4,599,781 | July 15, 1986 | Diperstein |
| 4,662,806 | May 5, 1987 | Reed |
| 4,824,279 | April 25, 1989 | Casazza |
| 4,845,828 | July 11, 1989 | Reed |
| 4,892,429 | January 9, 1990 | Giannuzzi |
| 5,033,919 | July 23, 1991 | Choe |
| 5,379,505 | January 10, 1995 | Reed |
| FOREIGN PATENT DOCUMENTS | | |
| UK 350,141 | June 11, 1931 | Arenz |
| IT 456,481 | December 1950 | |
| AU 154,074 | November 10, 1953 | Metalock of Australia |
| SU 492,389 | January 22, 1976 | Ivanov Furniture |
| SU 975,270 | November 28, 1982 | Mosc Auto Mech Inst. |

The other prior art listed above but not specifically described further catalog the prior art of which the applicant is aware. These references diverge even more starkly from the references specifically distinguished above.

SUMMARY OF THE INVENTION

The present invention is distinguished over the known prior art in a multiplicity of ways. For one thing, the present invention provides a thread repair insert which not only repairs threads of a threaded hole but also draws together opposite sides of a crack which may have propagated through the threaded hole. In addition, the thread repair insert according to the present invention provides clamping means which allows the insert to lock into the material to preclude disengagement of the insert from the threaded hole. The clamping means, inter alia, precludes opposite sides of the crack from moving in a direction generally along an axis of the thread repair insert. Furthermore, the thread repair insert strengthens a damaged threaded hole to a level which effectively allows a threaded fastener to be rigidly retained therein and to provide a seal which will withstand a pressurized environment.

In a preferred form, the thread repair insert of the present invention includes a drive head with a means to apply torque thereto, a neck below the head, a shoulder below the neck and a sleeve substantially below the shoulder. Preferably, a thread relief portion is interposed between the shoulder and the sleeve.

The sleeve is provided with an interior thread and an exterior thread. The exterior thread of the sleeve is adapted to be threaded into a hole having a thread pitch which is formed complementally to the exterior thread of the sleeve. The interior threads are preferably adapted to receive a desired standard threaded fastener.

The drive head of the insert can include any of a variety of torque-receiving configurations. For instance, the drive head can have multiple facets dimensioned to be addressed by facets of a wrench. In addition, slots may be formed complementally to a slotted screw driver or other similar structures. Thus, the drive head receives torque and causes the thread repair insert to rotate about a central, long axis thereof.

The neck includes a break-off groove which is interposed between the drive head and the shoulder and preferably defines an area of the thread repair insert having a weakest tensile strength experiencing torsional loads. Thus, when torque is applied through the drive head at greater and greater magnitudes, the thread repair insert fractures at the break-off groove before fracturing in any other location.

The shoulder is interposed between the neck and the exterior threads of the sleeve and includes a cusp exposed at a lower most portion of the shoulder. The cusp is formed by a greater diameter portion and a lesser diameter portion, with the lesser diameter portion adjacent the exterior threads of the sleeve. Thus, as the thread repair insert is threaded into a complementally formed threaded hole, the cusp of the shoulder abuts against an outer surface of the hole and identifies a point at which the insert can translate no further along the central, long axis. In addition, when the cusp of the shoulder contacts the outer surface of the hole there is a wedging or clamping effect caused by the cusp of the insert and the inter engagement of the threads of the insert within the complementally threaded hole. Therefore, the clamping means precludes disengagement of the insert from the threaded hole and the upheaval of opposite sides of the cracked threaded hole. Furthermore, the thread repair insert strengthens and seals the cracked threaded hole such that a threaded fastener may be received and retained within said threaded hole via the thread repair insert.

The sleeve is a substantially cylindrical construct having a top adjacent the cusp of the shoulder and a bottom defining a surface of the insert opposite the head. The sleeve has threads circumscribing an outer periphery and an inner periphery thereof. The exterior threads disposed on the sleeve include a crest defining a major diameter thereof and a root defining a minor diameter thereof. An upper surface extends from a bottom edge of the root to an upper edge of the crest. A lower surface extends from a top edge of the root to a lower edge of the crest. Specifically, the upper surface extends linearly upward from the bottom edge of the root to the upper edge of the crest. Similarly, the lower edge extends linearly upward from the top edge of the root to the lower edge of the crest. Thus, the upper edge of the crest is closer to the head than the adjacent bottom edge of the root.

In mending the threaded hole, the hole is preferably tapped such that it is configured to have threads substantially complementally to the exterior threads of the thread repair insert. However, a major diameter of the tapped threaded hole may be slightly greater than a major diameter of the thread repair insert. The insert is threaded into the hole by applying torque to the head of the insert causing the insert to rotate and causing the upper surface of the exterior threads to slide along the complementally formed threads of the hole. Thus, drawing opposite sides of the threaded hole toward each other and hence opposite sides of the crack toward each other This torque continues to be applied until the cusp of the shoulder abuts the surface of the material adjacent the threaded hole. At that point, the thread repair insert ceases to be threaded into the material. However, the application of torque continues until a maximum torsional force for the break-off groove of the neck is reached causing the head to shear off at the break-off groove.

In addition, multiple threaded holes may be located along the length of the crack and filled with crack repair stitching pins to further mend the crack. Furthermore, locks may be placed transverse to the crack which fit within complementally formed lock receiving holes to also further mend the crack.

OBJECTS OF THE INVENTION

A primary object of the present invention is to provide a new and novel thread repair insert for repairing a threaded hole.

A further object of the present invention is to provide the thread repair insert as characterized above which includes a drive head which is driveable by a commonly available torque-applying instrumentality.

Another further object of the present invention is to provide the thread repair insert as characterized above which further includes a sleeve having interior and exterior threads disposed thereon.

Another further object of the present invention is to provide a thread repair insert as characterized above which includes a shoulder interposed between said drive head and said sleeve.

Another further object of the present invention is to provide the thread repair insert as characterized above wherein the shoulder includes means for opposing central axis translation of the thread repair insert when threaded in a threaded hole.

Another further object of the present invention is to provide a thread repair insert as characterized above wherein the central axis translation opposition means and the exterior threads of the sleeve create opposing forces which preclude the thread repair insert from disengaging from the threaded hole.

Another further object of the present invention is to provide the thread repair insert as characterized above which includes a break-off groove located at a transition area between a top surface of the shoulder and the drive head.

Another further object of the present invention is to provide a thread repair insert as characterized above which is designed to enter a complementally formed hole a finite distance and in which the drive head severs off of the thread repair insert at the break-off groove location prior to the exterior threads of the sleeve becoming damaged.

Another further object of the present invention is to provide a thread repair insert as characterized above which includes means for drawing together opposite sides of a crack which has propagated through a threaded hole.

Another further object of the present invention is to provide a thread repair insert as characterized above which strengthens and seals a cracked threaded hole such that a threaded fastener may be received within said threaded hole via the thread repair insert.

Another further object of the present invention is to provide a thread repair insert as characterized above wherein the exterior threads angle upwards towards the head of the insert.

Another further object of the present invention is to provide a thread repair insert wherein the exterior threads are slightly spaced from each other and maintain a minimum thickness between a root and a crest thereof, providing a durable thread.

Another further object of the present invention is to provide a thread repair insert as characterized above which is simple and inexpensive to manufacture and yet durable in construction.

Another further object of the present invention is to provide a thread repair insert as characterized above for cold crack repair which quickly mends cracks which have propagated within a threaded hole in a material and for receiving a threaded fastener therein.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to the thread repair insert according to the present invention.

In essence, and referring to FIGS. 1 through 4, the thread repair insert 10 includes a drive head 20 at an uppermost portion thereof, a neck 30 below the drive head 20, a shoulder 40 below the neck 30 and a sleeve 60 extending below the shoulder 40. The sleeve 60 includes an exterior threaded portion 62 which extends from an upper portion 64 to a bottom portion 66. The exterior threaded portion 62 includes a plurality of threads 68 thereon which include an upper surface 72 and a lower surface 74 which extend upward toward the head 20 from a minor diameter 69 to a major diameter 70. Thus, a crest 76 of each thread 68 is closer to the head 20 than a portion of the thread 68 between adjacent roots 82 at the minor diameter 69.

The thread repair insert 10 further includes an interior bore 100 extending from a first end 102 to a second end 104. A chamfer 106 is provided on a top surface 22 of the head 20 and provides a transition area between the top surface 22 of the head 20 and the first end 102 of the interior bore 100. Preferably, the interior bore 100 includes a cylindrical side wall 110 which extends between the first end 102 of the interior bore 100 to an area adjacent a top surface 42 of the shoulder 40. The interior bore 100 then transitions to an in-taper 112 which preferably tapers inwardly from the area adjacent the top surface 42 of the shoulder 40 to a start of interior threads 114. The interior threads 114 preferably extend from in-taper 112 to the second end 104 of the interior bore 100. Preferably, the interior threads 114 are of a common type which include an inner diameter 116 and an outer diameter 118. Each thread includes an upper side 120 and a lower side 122.

In mending a threaded hole H in which a common threaded fastener 150 is to be received, the threaded hole H is tapped using a tapping bit 200 (FIGS. 5 through 7) which causes threads T to be formed in the threaded hole H which are substantially complementally to the exterior threads 68 of the thread repair insert 10. The threads T of the threaded hole H thus are closer to a surface S of a material M at a major diameter A of the threads T than at a minor diameter B of the threads T.

The drive head 20 may be coupled to a torque applying instrument which can thread the thread repair insert 10 into the threaded hole H. The shoulder 40 includes a cusp 50 exposed at a lowermost portion thereof. Thus, when the thread repair insert 10 has been threaded entirely into the threaded hole H, the cusp 50 of the shoulder 40 abuts against the material M. This abutment, inter alia, prevents the pin 10 from translating along a central long axis 12 any deeper into the hole H.

Upon rotation of the thread repair insert 10, the upper surface 72 of the exterior threads 68 engage the threads T of the hole H forcing a first curved wall G of the hole H on one first side D of the crack C toward a second curved wall I of the hole H on a second side E of the crack C. Thus, the first side D and the second side E of the crack C are drawn toward one another.

The neck 30 includes a crease or break-off groove 32 which fractures, shearing the head 20 off of the thread repair insert 10 before a magnitude of torque applied to the insert 10 reaches a maximum torque allowed to be applied to the exterior threads 68. Thus, the head 20 shears off at the break-off groove 32 prior to torsion ally over stressing the exterior threads 68. Head 22 is then discarded.

Figure 1:
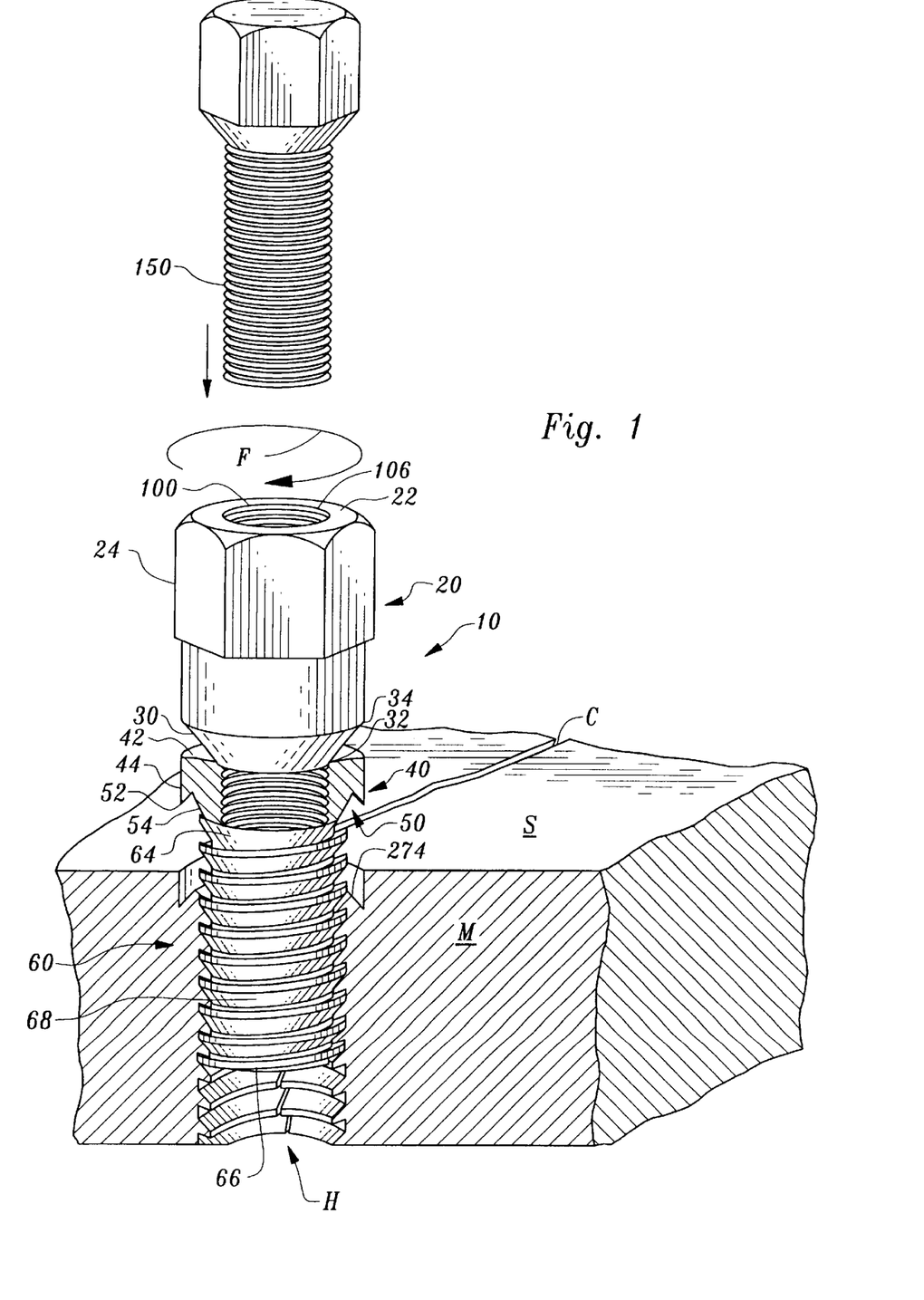
FIG. 1 is an elevational view of a thread repair insert according to the present invention which is shown partially disposed into a threaded hole being repaired to receive a threaded fastener, the hole is shown in section.
Figure 2:
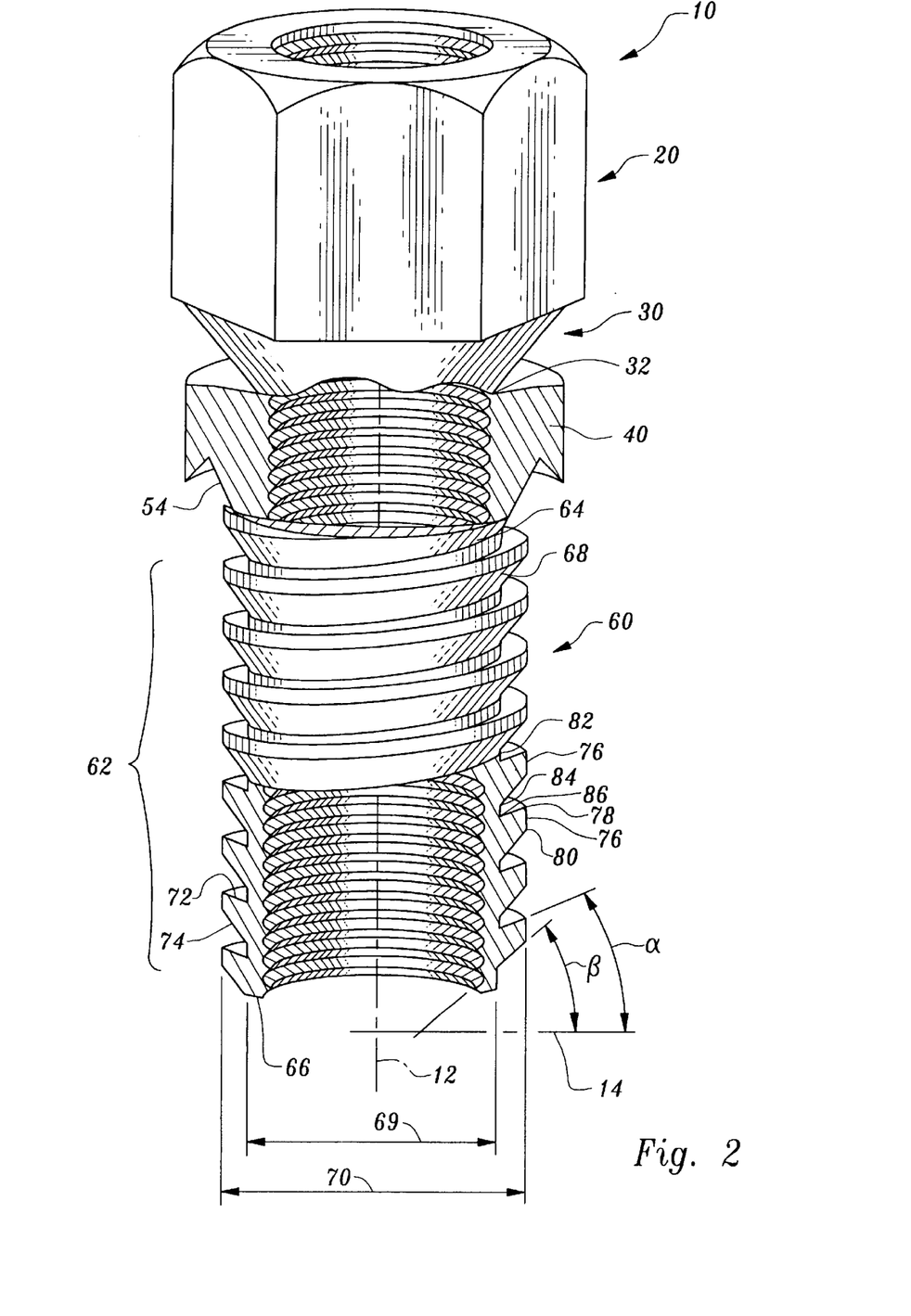
FIG. 2 is a partial sectional view of the thread repair insert of FIG. 1 showing detail of exterior threads.
Figure 3:
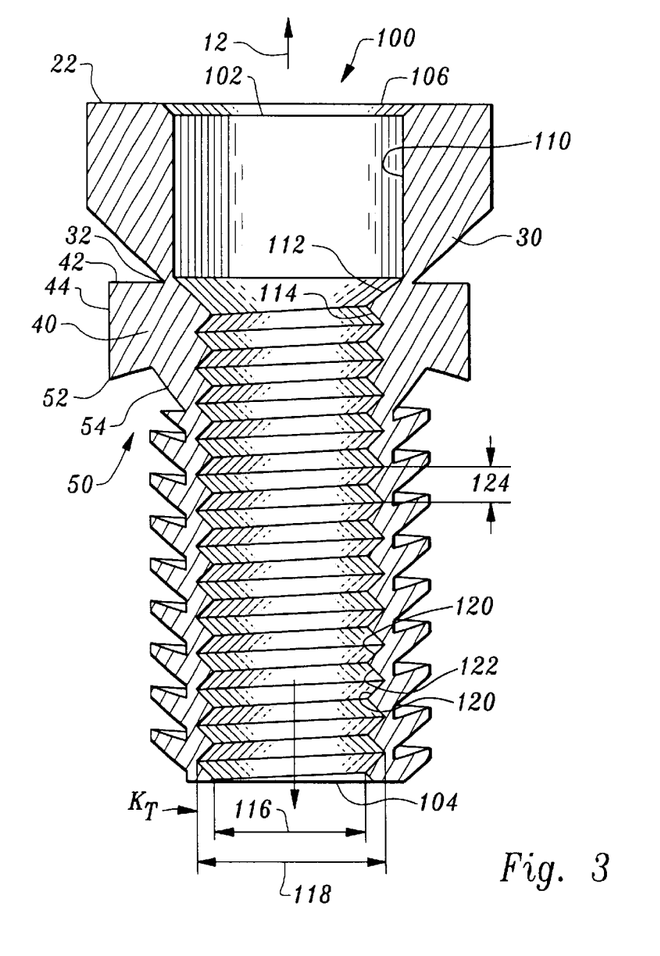
FIG. 3 is a cross-sectional view of the thread repair insert shown in FIG. 1.

More specifically, and referring in detail to FIGS. 1 through 4, the thread repair insert 10 and associated hole H are shown in detail. The thread repair insert 10 includes the head 20 at an uppermost end thereof. The head 20 preferably includes multiple facets 24 arranged to allow a torque applying device to effectively engage the head 20. Preferably, the facets 24 are arranged in a hexagonal pattern to be engaged by a variety of commonly available torque applying tools. Alternatively, various other facet arrangements could be utilized or slots could be provided in the top surface 22 of the head 20 for receiving a screwdriver or other similarly shaped tool. In addition, an internal hex head may be formed on an internal sidewall 110 of the head 20 (FIG. 3). The head 20 is preferably radially symmetrical about a central axis 12 passing through the thread repair insert 10.

The neck 30 joins the head 20 to the shoulder 40. The neck 30 is preferably arranged as a single frustum with a greater diameter base 34 adjacent the head 20 and a lesser diameter crease or break-off groove 32 adjacent the shoulder 40. The break-off groove 32 and base 34 thus define parallel planes of the frustum of the neck 30. The break-off groove 32 is preferably designed to have a cross-sectional area which is less than a cross-sectional area of almost any other portion of the thread repair insert 10. Thus, when torsional loads increase, the thread repair insert 10 is most likely to fracture at the break-off groove 32 than at any other location along the thread repair insert 10.

In addition, the break-off groove 32 is preferably provided with a cross-sectional area which gives the break-off groove 32 a maximum torsional load characteristic which is less than a torsional load necessary to cause damage to the exterior threads 68 of the exterior threaded portion 62 of the sleeve 60. In this way, if torsional loads on the thread repair insert 10 begin to approach a level which may cause damage to the exterior threads 68 of the exterior threaded portion 62, the break-off groove 32 of the neck 30 will fracture before a damaging torsional load is reached which will damage the threads 68.

The shoulder 40 is interposed substantially between the neck 30 and the sleeve 60. The shoulder 40 includes a top surface 42, a cylindrical side portion 44 and a cusp 50 exposed at a lowermost portion of the shoulder 40. The top surface 42 of the shoulder 40 is adjacent the break-off groove 32 and transitions into the cylindrical side portion 44. The cusp 50 is located at the lowermost portion of the shoulder 40 and includes an upslope 52 which preferably diverges inwardly and upwardly toward the central axis 12 and then transitions into a downslope 54 which preferably diverges inwardly and downwardly-toward the central axis 12. The downslope 54 of the cusp 50 transitions into the top 64 of the exterior threaded portion 62 in which the helically wound exterior threads 68 terminate.

The cusp 50 of the shoulder 40 abuts against a surface S of a material M surrounding the threaded hole H when the thread repair insert 10 is threaded into the threaded hole H a sufficient distance along the central axis 12. Thus, this identifies one point at which the thread repair insert 10 can translate no further along the central axis 12. Should the bottom of the insert 10 reach a blind core of the thread hole H, the same phenomena of freezing the insert 10 into the hole H will occur. As one consequence, referring to FIGS. 11 through 13, when the cusp 50 of the shoulder 40 abuts against the surface S adjacent the threaded hole H there is a wedging or clamping effect along the arrows F1 and F2. This clamping effect is caused by the abutment of the cusp 50 with the surface S and the inter engagement of the threads 68 of the insert 10 with the complementally formed threads T of the threaded hole H. Thus, opposing forces are developed along arrows F1 and F2 which preclude the exterior threads 68 from disengaging from the complementally formed threads T of the threaded hole H. More importantly, the compressive effect of forces F1, F2 prevent "upheaval" with respect to opposite sides of the cracks. In other words, side D (FIG. 12) will not "shift" or move (e.g. into another plane) relative to side E. The opposing forces arrows F1 and F2 also precludes the thread repair insert 10 from rotating when a standard threaded fastener 150 is being disposed therein.

The abutment of the cusp 50 with the surface S also causes the exterior threads 68 of the thread repair insert 10 to further draw the first side D and the second side E of the crack C toward each other, rather than the exterior threads 68 drawing the thread repair insert 10 further into the threaded hole H along the central axis 12. Thus, the cusp 50 of the shoulder 40 further acts to redirect forces radially inwardly, i.e. towards the center of the thread repair insert 10 and the threaded hole H along arrows F3, F4 of FIG. 11.

The exterior threaded portion 62 of the sleeve 60 is of a substantially cylindrical construct which extends from a location adjacent the downslope 54 of the cusp 50 of the shoulder 40 to the bottom 66 of the sleeve 60. The bottom 66 of the sleeve 60 defines an opposite end of the thread repair insert 10 from the head 20. The exterior threaded portion 62 is oriented about the central axis 12 with the central axis 12 passing through a geometric center of the sleeve 60. The sleeve 60 has the exterior threads 68 formed about the cylindrical surface thereof.

The exterior threads 68 are preferably one continuous helically wound thread which begins at the bottom 66 and spirals up to a top 64. While this single thread design is preferred, other arrangements including a compound series of threads which wind helically together from the bottom 66 to the top 64 could also be utilized.

Referring to FIG. 2, the exterior threads 68 include the crest 76 defining the major diameter 70 of the exterior threads 68. The exterior threads 68 have an upper surface 72 which extends from a bottom edge 86 of a root 82 to an upper edge 78 of the crest 76. The exterior threads 68 also include a lower surface 74 which extends from a top edge 84 of the root 82 to a lower edge 80 of the crest 76. Both the upper surface 72 and the lower surface 74 angle upward toward the head 20 as the surfaces 72, 74 extend from the root 82 to the crest 76. Both the crest 76 and the root 82 exhibit a substantially constant distance from the central axis 12 between the upper edge 78 and the lower edge 80 and between the top edge 84 and the bottom edge 86.

In section, the surfaces 72, 74 extend linearly from the root 82 to the crest 76. However, as this contour is rotated helically about the sleeve 60 along with the threads 68, the upper surface 72 and lower surface 74 take on a curved surface appearance. This appearance is similar to that which would be formed by a linear section of the surface of a cone with a tip of the cone oriented downward and the cone rotated and translated upward along a central axis thereof. The upper surface 72 and the lower surface 74 thus have a curved surface in three dimensions similar to that of a cone, but a linear character when viewed in section.

The upper surface 72 extends from the root 82 to the crest 76 at an upper surface angle ut diverging from a reference plane 14 orthogonal to the central axis 12. The upper surface angle ou is preferably approximately 20 degrees but could be any angle between 0 degrees and 90 degrees. The lower surface 74 extends from the root 82 to the crest 76 at a lower surface angle β with respect to the reference plane 14. The lower surface angle β is preferably approximately 40 degrees but could also vary between 0 degrees and 90 degrees.

Preferably, the upper surface angle α is less than the lower surface angle β such that a thickness of the exterior thread 68 at the crest 76 is less than a thickness of the threads 68 between adjacent roots 82. In this way, the threads 68 are provided with greater thickness, and hence greater strength, adjacent the minor diameter 69 than at the major diameter 70 and are thus more capable of bearing the loads experienced within the threaded hole H. Alternatively, both angles could be parallel.

Figure 4:
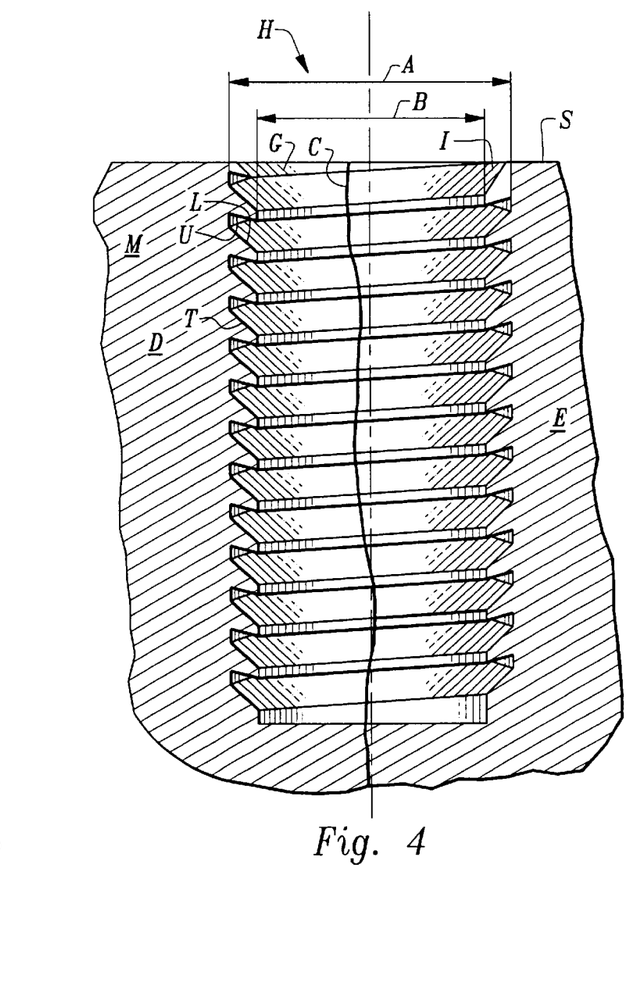
FIG. 4 is a sectional view of the threaded hole shown in FIG. 1.

Referring to FIG. 4, details of the threaded hole H are shown. The threaded hole H is preferably substantially complementally in form to the exterior threads 68 disposed on the sleeve 60 of the thread repair insert 10. The threaded hole H includes threads T which include a major diameter A and a minor diameter B. Each thread T includes a lower surface L and an upper surface U. In addition, the threaded hole H includes a first curved wall G on a first side D of the crack C and a second curved wall I on the second side E of the crack C. Thus, for example, the threaded hole H is substantially bisected by the crack C. However, when mending a threaded hole in which a crack C has propagated therethrough, the distribution of the crack C on either side of the thread repair insert 10 may not be a symmetrical one.

The threads T of the threaded hole H are shaped to have surfaces U, L which conform to the upper surface 72 and the lower surface 74 of the exterior threads 68 of the thread repair insert 10. However, the major diameter A of the threaded hole H is preferably slightly greater than the major diameter 70 of the exterior threads 68 and the minor diameter B of the threads T is preferably slightly greater than a minor diameter 69 of the exterior threads 68.

This slight disparity provides a tolerance between the thread repair insert 10 and the threaded hole H for ease of fitting the thread repair insert 10 into the threaded hole H. Furthermore, this provides a finite amount of travel between the first curved wall G and the second curved wall I of the threaded hole H when the thread repair insert 10 is tightened therein, causing the first side D and the second side E of the crack C to be drawn toward each other. Thus, the major diameter A and minor diameter B of the threaded hole H are preferably initially greater than the major diameter 70 and the minor diameter 69 of the exterior threads 68. After tightening the thread repair insert 10 into the threaded hole H, this difference between the threaded hole H and the exterior threads 68 of the sleeve 60 is reduced or substantially eliminated. Note that the size difference between the threaded hole H and the exterior threads 68 may be unnecessary.

The thread repair insert 10 further includes an interior bore 100 having a first end 102 and a second end 104. Chamfer 106 is provided on the top surface 22 of the head 20 and transitions therefrom to the first end 102 of the interior bore 100. The interior bore 100 then transitions from the first end 102 to taper 112 via a cylindrical sidewall 110. The taper 112 transitions from a greater diameter adjacent the break-off groove 32 of the neck 30 to a lesser diameter adjacent an interior threaded portion 113. The interior threaded portion 113 includes interior threads 114 disposed thereon. The interior threads 114 are preferably of a conventional type and include an inner diameter 116 and an outer diameter 118. In addition, the interior threads 114 are provided with an upper side 120 and a lower side 122.

Figures 5, 6, 7:
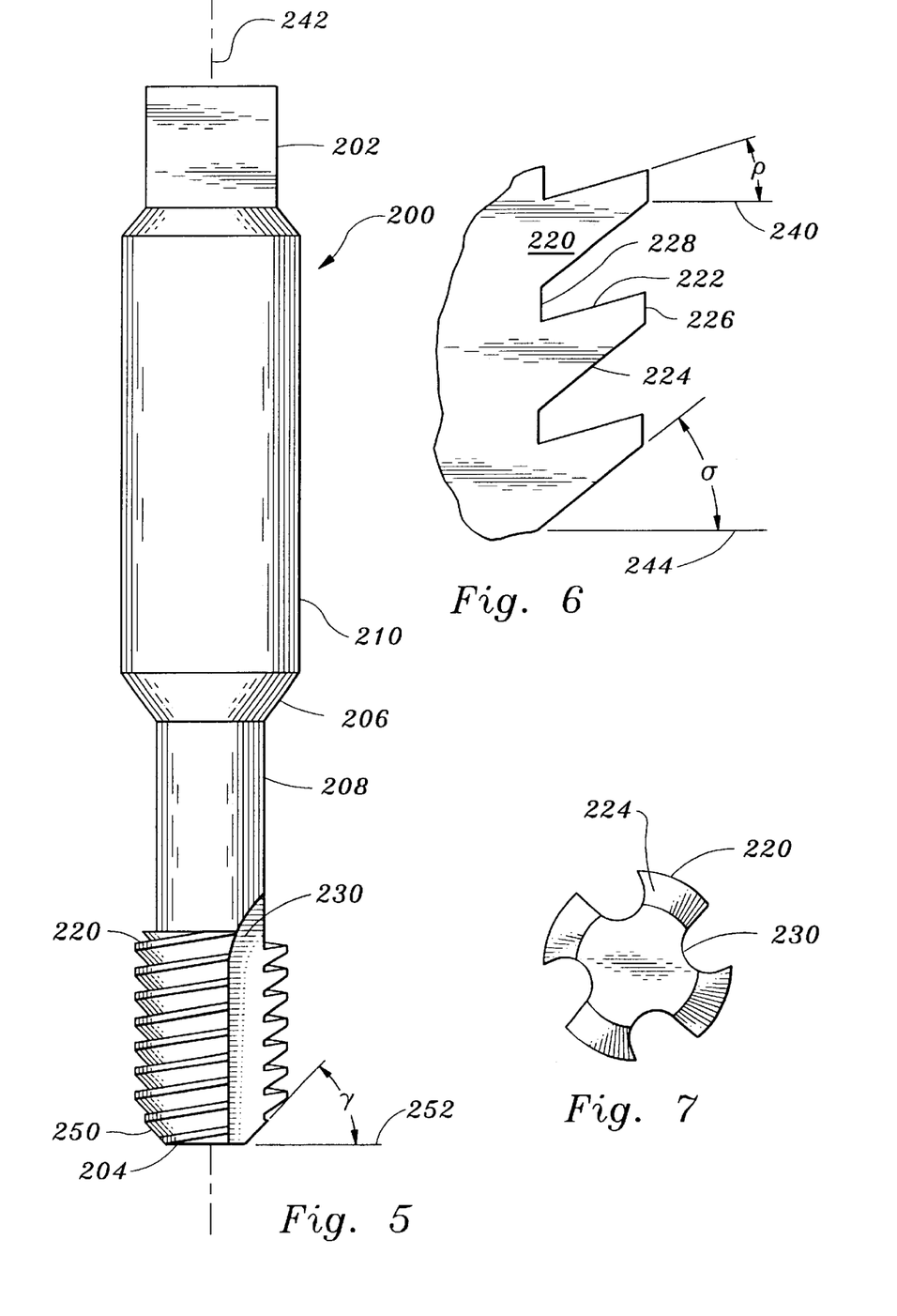
FIG. 5 is an elevational view of a tapping bit configured to form the threads shown in the threaded hole of FIG. 4.
FIG. 6 is a detail view of a portion of the teeth of the tap shown in FIG. 5.
FIG. 7 is a bottom view of that which is shown in FIG. 5.

FIGS. 5 through 7 show details of the tapping bit 200, preferably used to form the threaded hole H. The tapping bit 200 is preferably a substantially cylindrical construct having a torque input head 202 at one end thereof and a bottom 204 on an opposite end thereof. A stop 206 defines a transitional region between a lesser diameter portion 208 and a greater diameter portion 210 of the tapping bit 200. The stop 206 is preferably located a distance from the bottom 204 equal to a desired depth of the threaded hole H to be formed by the tapping bit 200.

A plurality of teeth 220 are oriented proximate the bottom 204 which extend helically around the tapping bit 200 at an angle approximately similar to an angle of the threads T within the threaded hole H. The teeth 220 include a upper side 222, a lower side 224, an outer side 226 and an inner side 228. The teeth 220 are interrupted by a cutout groove 230 which precludes the teeth 220 from forming one continuous tooth extending along the tapping bit 200. The cutout groove 230 allows filings cut out of the hole H by the tapping bit 200 to escape from the teeth 220 and thus allow the teeth 220 to cut the threads T into the hole H without obstruction.

The sides 222, 224, 226 and 228 are dimensioned in a manner similar to the threads T to be formed in the hole H. As noted above, the threads 68 of the thread repair insert 10 may be slightly smaller in minor diameter 69 and major diameter 70 than the threads T disposed within the threaded hole H and thus, the teeth 220 are preferably slightly larger in dimension than surfaces 72 and 74 of the thread repair insert 10. However, the shape of the teeth 220 forming the threads T of the threaded hole H may be substantially similar in size and shape.

The upper sides 222 of each of the teeth 220 are oriented at an upper side angle ρ from a reference plane 240 orthogonal to a long axis 242 of the tapping bit 200. The lower sides 224 of each of the teeth 220 are angled at a lower side angle σ with respect to a reference plane 244. The lower side angle σ and upper side angle ρ are preferably similar to the lower surface angle β and the upper surface angle α, respectively.

A portion of the teeth 220 directly adjacent the bottom 204 are preferably beveled at a bevel 250 having a bevel angle γ of approximately preferably 60 degrees from a reference plane 252 orthogonal to the long axis 242. This bevel 250 allows the teeth 220 to cut the thread T into the hole H in progressively greater amounts as the tapping bit 200 initially enters the hole H. While the tapping bit 200 is preferably utilized to form the threads T within the hole H, other tapping bits and other methods of forming and finishing the threads may be utilized to form the complementally threads T within the hole H.

As an alternative to the tapping bit 200, a series of taps may be used to most effectively form the threads T within the hole H. Initially, a roughing tap may be passed axially into the hole H to form a first rough shape of the threads T. The roughing tap may then be followed by a finishing tap which completes the formation of the threads T within the hole H. If the hole H is formed as a blind bore to receive the thread repair insert 10, a bottom tap may be utilized to fully form the threads T to within approximately one thread T of a bottom of the hole H. By utilizing the three taps in series, a more precisely and defined threaded hole H may be formed with less damage to each of the respective taps.

In forming the threads T within the threaded hole H, the tapping bit 200 is oriented overlying hole H and is coupled to an appropriate torque applying device such as a drill. The tapping bit 200 is then lowered into the hole H with the bottom 204 entering the hole H. As the tapping bit 200 is lowered within the hole H, the threads T are cut into the first curved wall G and the second curved wall I of the threaded hole H.

Figure 10:
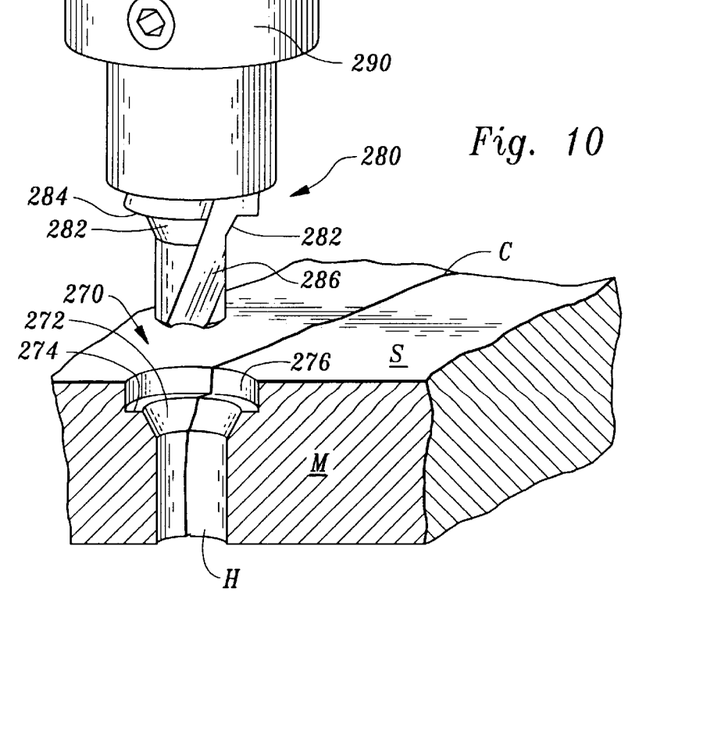
FIG. 10 is an isometric view of a bit utilized to form a counter-bore.

Referring to FIG. 10, the threaded hole H may be provided with a counter bore 270 at an upper end of the hole H adjacent the surface S of the material M. A spot facing bit 280 having a particularly formed cutting surface is utilized to form the counter bore 270. Particularly, the spot facing bit 280 includes an angled edge 282 having an angle which conforms to the slope of a thread relief 272 and a floor forming edge 284 having an angle which conforms substantially with the angle of the floor 274 of the counter bore 270. A pilot portion 286 of the spot facing bit 280 below the angled edge 282 is preferably not greater in diameter than a diameter of the hole H. Thus, when the spot facing bit 280 is lowered axially into the hole H, the angled edge 282 and the floor forming edge 284 form the counter bore 270. Depth of the counter bore 270 is preferably controlled by some form of drill stop 290 or other jig to preclude the counter bore 270 from passing too deeply into the hole H.

Preferably, the floor forming edge 284 and the angled edge 292 are angled to form a cusp in the floor 274 which complements the geometry of the cusp 50 disposed on the lower surface of the shoulder 40. Thus, the cusp 50 of the shoulder 40 is received within the floor 274 of the counter bore 270 and abuts thereagainst. Therefore, the opposing forces F1 and F2 are brought about by the cusp 50 of the shoulder 40 abutting the floor 274 of the counter bore 270 and the upper surface 72 of the exterior threads 68 against the upper surface U of the threaded hole H. Furthermore, the counter bore 270 may be formed before or after the hole H is tapped.

Figure 14:
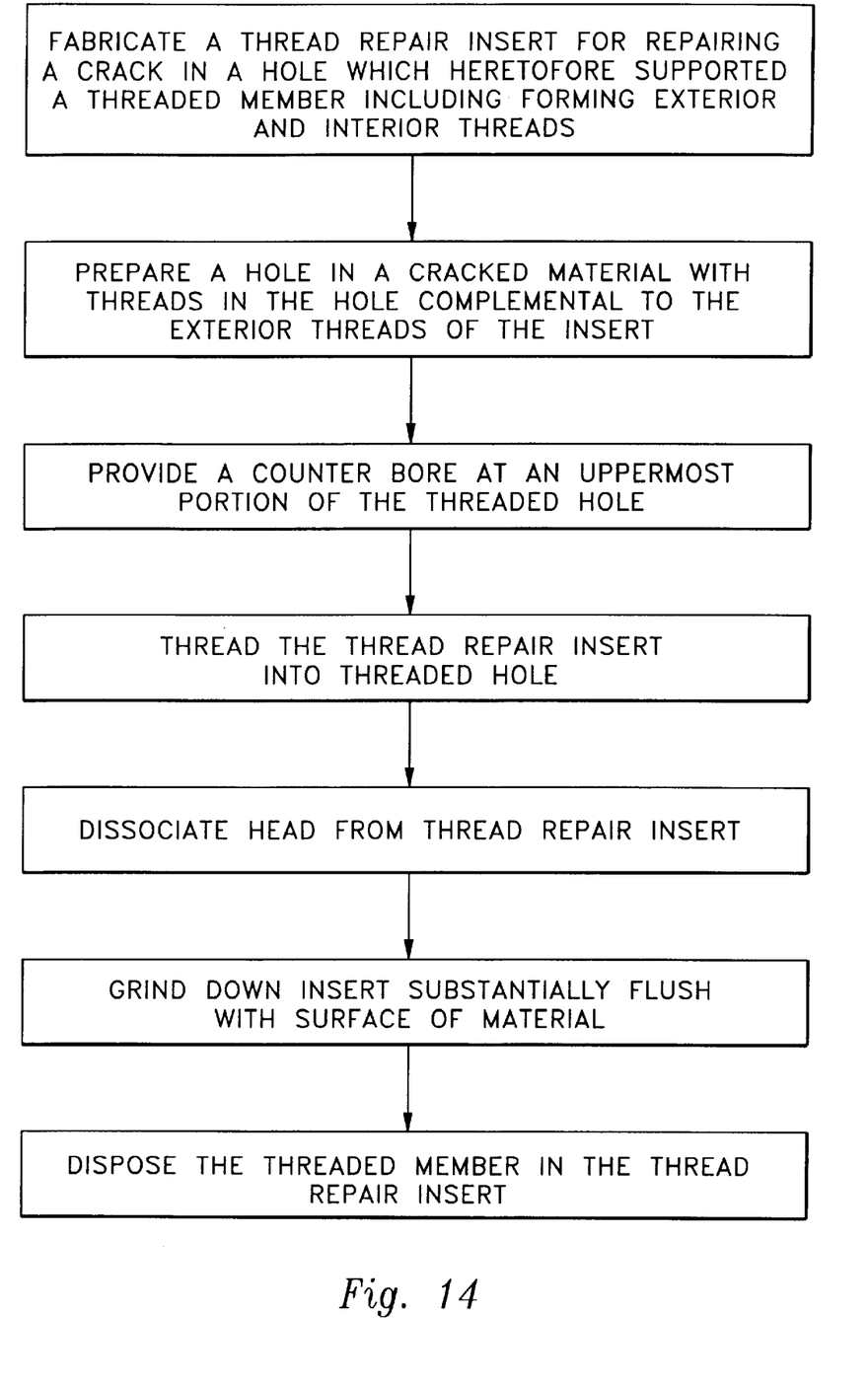
FIG. 14 is a flow chart revealing the steps according to the present invention involved in the method of repairing a threaded hole to receive a threaded fastener.

In use and operation, and for example, the thread repair insert 10 is utilized for cold crack repair of a threaded hole H in which a threaded fastener is to be received via the insert 10. For example, and referring to FIGS. 8 and 14, a standard threaded hole H is shown in which a crack has propagated therethrough. Preferably, the first step in repairing the standard threaded hole H' is to prepare it for receiving the thread repair insert 10. This is accomplished by removing or drilling out the previous standard threaded fastener which may still be retained within the threaded hole H'. Once the standard threaded fastener has been removed or a hole H' is provided, the tapping bit 200 (FIG. 5) is preferably used to form the threads T of the hole H as is detailed in FIG. 4.

Preferably, the threaded hole H includes a counter bore 270 formed at a transition area between the hole H and the surface S of the material M. The counter bore 270 preferably includes a cylindrical side portion 276 dimensioned similarly to the cylindrical side surface 44 of the shoulder 40. The cylindrical side portion 276 of the counter bore extends from the surface S down to the floor 274 which is preferably cusped. The floor is formed by the floor forming edge 284 and the angled edge 282 of the spot facing bit 280. The floor 274 preferably substantially complements the geometry of the cusp 50 of the shoulder 40.

The spot facing tool is important in that, inter alia, it determines the amount of the shoulder 40 which remains after grinding or machining the shoulder substantially flush with the surface S of the material M. In addition, the spot facing tool provides the shoulder with a precision fit and seat. Furthermore, the spot facing tool may provide a relief cut 272 for a first exterior thread of the thread repair insert 10. The relief cut 272 may be provided as a result of the possibility of the first exterior thread of the insert 10 being partially incomplete when manufactured. Thus, the relief cut prevents the first exterior thread from spreading the crack prior to the exterior threads having a chance to seat within the threaded hole H.

Figure 11:
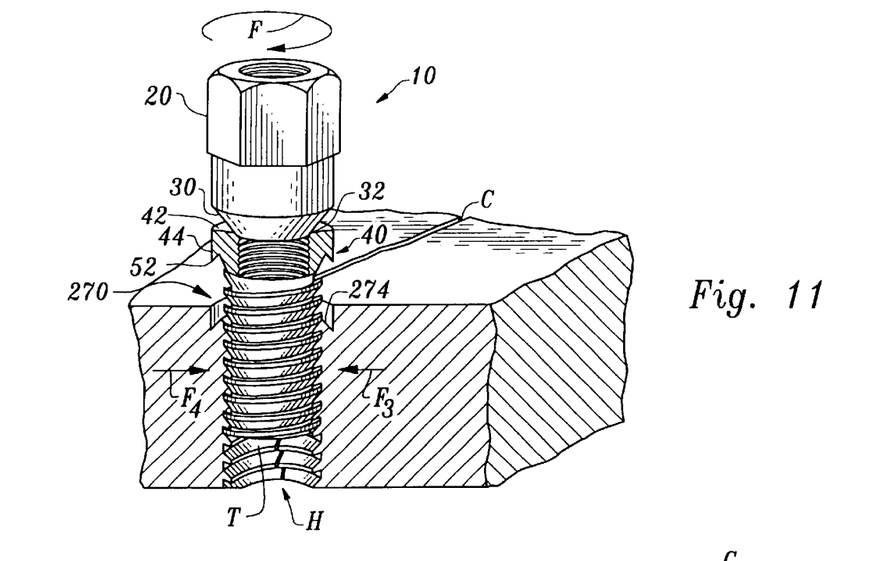
FIG. 11 is an isometric view of the thread repair insert entering the bore shown in FIG. 10.

Referring now to FIGS. 11 through 14, details of the utilization of the thread repair insert 10 are shown. After the threads T are formed within the threaded hole H and the counter bore 270 has been formed, the thread repair insert 10 is disposed within the threaded hole H. The thread repair insert 10 is disposed within the threaded hole H by applying torque to the drive head 20 causing rotation of the thread repair insert 10 about arrow F (FIG. 11). This rotation causes the upper surface 72 of the exterior threads 68 to slide along the complementally formed threads T of the hole H. Thus, drawing opposite sides D, E of the threaded hole radically toward each other along arrows F3, F4 and hence opposite sides of the crack toward each other.

Rotation continues about arrow F until the shoulder 40 abuts against the floor 274 of the counter bore 270 and thus, providing the clamping effect (forces F1, F2) discussed supra. As additional rotational forces are applied about arrow F, opposite sides of the crack C are drawn further together as discussed hereinabove with utilization of the thread repair insert 10. Once sufficient torque is applied that the neck 30 can no longer resist deformation, the head 20 is severed therefrom at the break-off groove 32 (please see FIG. 12). At this time, a portion of the shoulder 40 may be ground or machined flush until coplanar with the surface S of the material M.

Figures 12, 13:
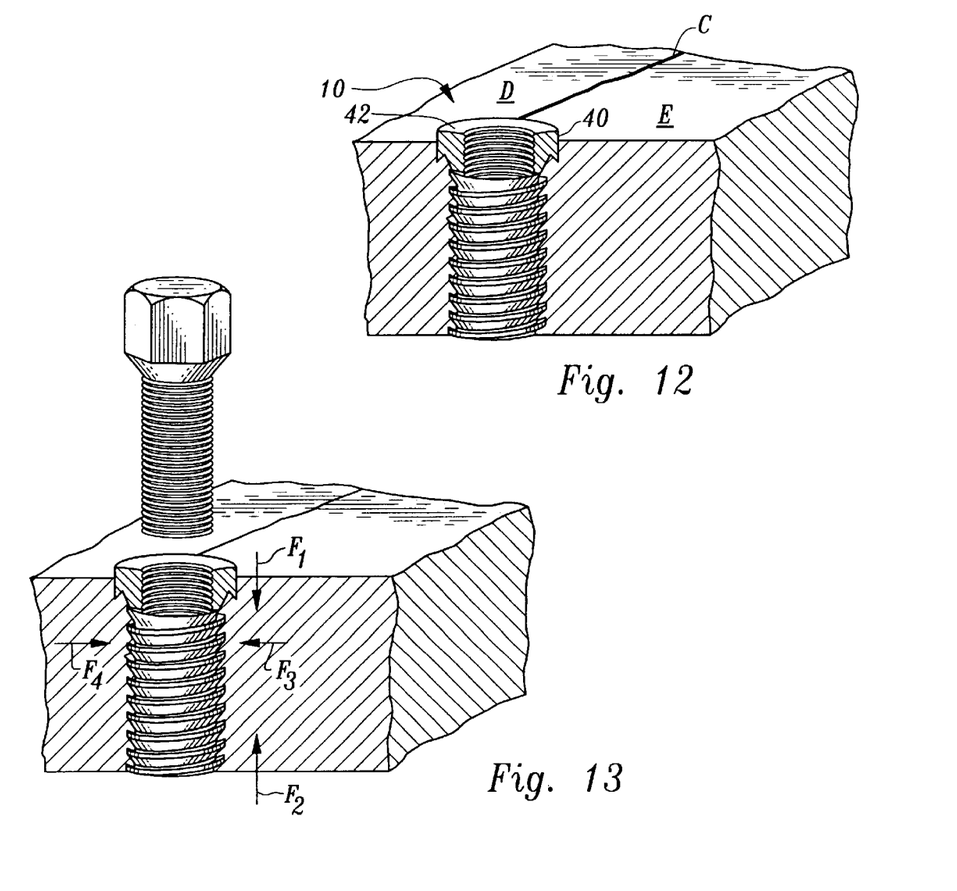
FIG. 12 is an isometric view of that which is shown in FIG. 11 with the thread repair insert coupled within the bore and a head of the insert sheared off.
FIG. 13 is an isometric view of that which is shown in FIG. 12 with a portion of a shoulder of the thread repair insert ground flush with a surface and ready to receive a threaded fastener.

Referring to FIG. 13, the standard threaded fastener 150 or the like, may be disposed within the thread repair insert 10. Preferably, the threaded fastener 150 is provided with threads which are substantially complementally in form to the interior threads 114 of the thread repair insert 10.

Figure 15:
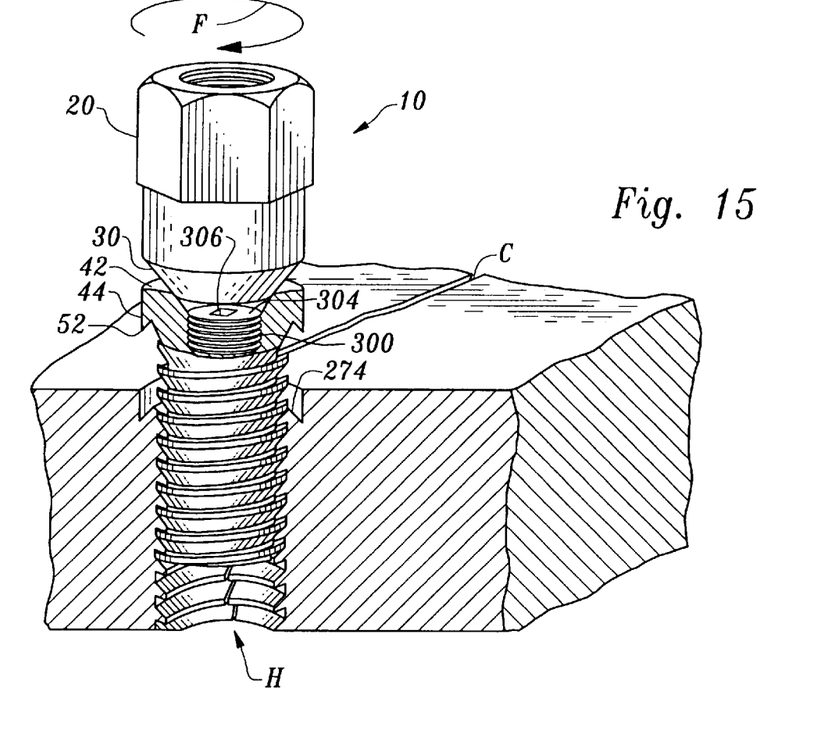
FIG. 15 is a partial sectional view of the thread repair insert showing detail of a threaded blank disposed within the insert.
Figure 16:
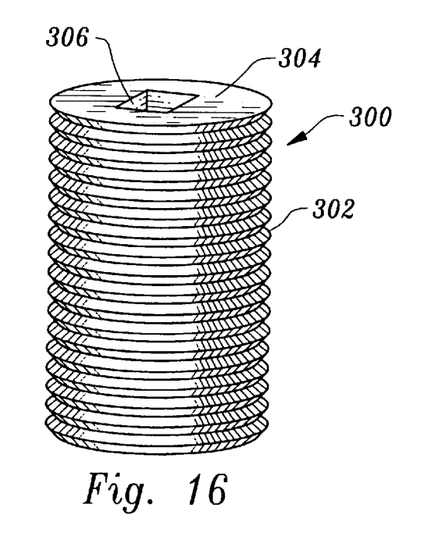
FIG. 16 is an elevational view of the threaded blank shown in FIG. 15.
Figure 17:
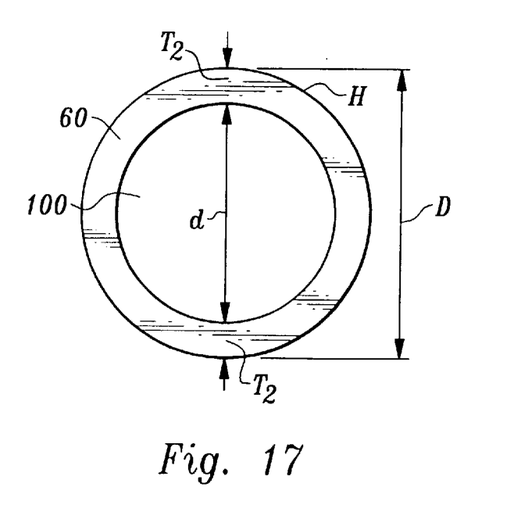
FIG. 17 is a top view of the sleeve of the insert resizing a hole.

Referring to FIGS. 15 and 16, a blank 300 may be disposed within the thread repair insert 10 prior to the insert 10 being threaded into the threaded hole H. The blank 300 includes threads 302 disposed thereon which are preferably complementally to the interior threads 114 of the insert 10. One purpose for providing the blank 300 may be to keep the interior threads clean or to retain the integrity of the interior threads 114 when applying a torque to the drive head 20 which will cause the head 20 to shear at the break-off groove 32. Preferably, a top 304 of the threaded blank 300 is at a location which is below the shoulder 40 of the thread repair insert 10 such that the threaded blank 300 does not interfere with the shearing of the drive head 20 from the shoulder 40 or with the shoulder being ground or machined flush with the surface S. The blank 300 preferably includes a torque receiving means 306 such that the blank 300 may be easily inserted in and removed from the interior bore 100. The torque receiving means 306 may be in the form to receive a standard ratchet or a typical screwdriver or the like. After the repair has been made, blank 300 can be removed and a stud or other insert such as a spark plug can be properly installed. Therefore, the thread repair insert may be provided with an open or blind interior bore 10 by providing an opened or closed second end 104 of the interior bore 100.

Figures 8, 9:
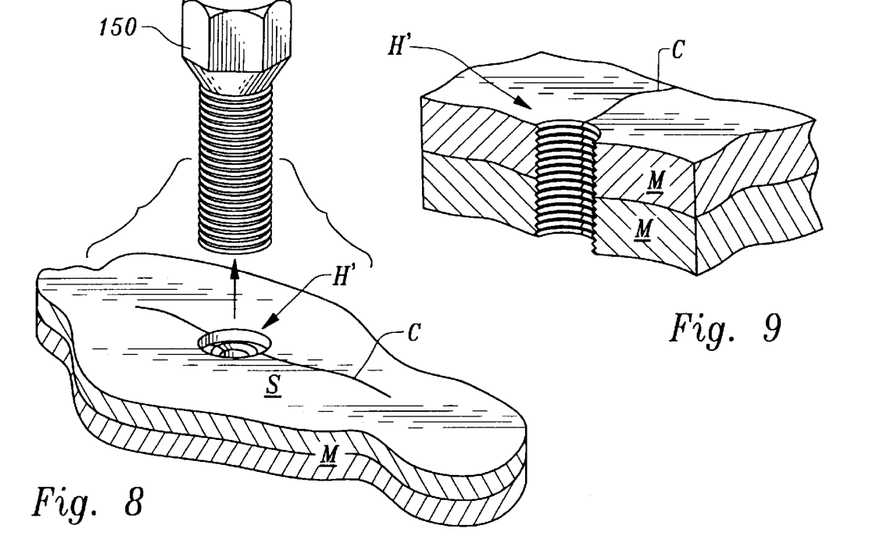
FIG. 8 is an elevational view of a conventional stud withdrawn from a bore which is to be mended according to the present invention.
FIG. 9 is a sectional view of the bore shown in FIG. 8, before the bore is tapped.

Furthermore, and referring to FIGS. 8 and 15, the hole H' is preferably oversized from a first diameter once capable of receiving the threaded fastener 150 to a second, greater diameter threaded hole H. The diameter D of the second, greater diameter threaded hole H can be determined from the following formula:

$$D=d+2T$$

where D is the diameter of the second, greater diameter threaded hole H, d is the diameter of a member received within the sleeve 62 of the insert 10, and T is the thickness of the sleeve 62.

For example, D represents a major diameter of the threads 220 of the tapping bit 200, d represents a major diameter of a threaded portion of the threaded fastener 150 and T represents the thickness of the sleeve 62 measured from a major diameter 70 of the external threads 68 to an outer diameter 118 of the interior threads 114 of the interior bore 100.

Thus, the sleeve 62 may be threaded into the hole H for re-sizing the hole from the second, greater diameter D to the first diameter d for receiving the threaded fastener 150.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for repairing a cracked threaded hole in a material to receive a fastener therein, including the steps of:

providing a thread repair insert including a sleeve having an exterior thread and an interior thread, a driving head, and a shoulder interposed between the sleeve and the driving head, the shoulder having a portion of greater width than the cracked threaded hole, wherein the exterior thread is at an upwardly inclined angle with respect to a reference plane orthogonal to a central axis of the sleeve;

forming a thread within the hole which is substantially complemental to the exterior thread of the thread repair insert; and threading the thread repair insert into the hole such that the exterior thread coacts with hole threads formed in said forming step to force opposite sides of the crack toward each other.

2. The method of claim 1 including wedging the insert into the hole by forcing one end of the insert to react to the material and against the threads of the insert.

3. A method for repairing a crack passing about a hole which heretofore supported a member, including the steps of:

oversizing the hole from a first diameter once capable of receiving the member to a second, greater diameter;

forming threads into the second, greater diameter hole;

fabricating a thread repair insert including forming a sleeve having exterior threads and a thickness for re-sizing the hole from the second greater diameter to the first diameter;

threading the insert into the second, greater diameter hole; and receiving the member into the sleeve, wherein forming the sleeve having the exterior threads includes forming the exterior threads at an upwardly inclined angle with respect to a reference plane orthogonal to a central axis of the sleeve wherein threading the insert into the second, greater diameter hole causes the exterior threads to coact with the threads formed in the second, greater diameter hole to draw the crack together and to preclude upheaval between the sides of the crack.

4. The method of claim 3 wherein forming the sleeve having the exterior threads includes forming the exterior threads at an upwardly inclined angle with respect to a reference plane orthogonal to a central axis of the sleeve wherein threading the insert into the second, greater diameter hole causes the exterior threads to coact with the threads formed in the second, greater diameter hole to draw the crack together and to preclude upheaval between sides of the crack.

5. The method of claim 3 wherein forming the sleeve includes the step of forming an interior bore therein with a diameter generally equal to a diameter of the member which was heretofore supported in the hole.

6. The method of claim 5 wherein forming the interior bore includes forming threads into the interior bore for receiving a threaded member into the sleeve.

7. The method of claim 6 wherein oversizing the hole includes the step of determining a diameter of the second, greater diameter hole from the formula:

$$D=d+2T$$

where D is the diameter of the second, greater diameter hole, d is the diameter of the member received within the sleeve, and T is the thickness of the sleeve.

8. The method of claim 7 wherein forming the sleeve having the thickness for re-sizing the hole includes forming the sleeve with a substantially constant thickness for re-sizing the hole.

* * * * *